United States Patent
Hucker et al.

(10) Patent No.: US 10,961,767 B2
(45) Date of Patent: Mar. 30, 2021

(54) FIXING AND/OR EMERGENCY OPENING SYSTEM FOR A DOOR LEAF

(71) Applicant: Geze GmbH, Leonberg (DE)

(72) Inventors: Matthias Hucker, Marxzell (DE); Florian Birkenmayer, Singen (DE)

(73) Assignee: Geze GmbH, Leonberg (DE)

( * ) Notice: Subject to any disclaimer, the term of this patent is extended or adjusted under 35 U.S.C. 154(b) by 359 days.

(21) Appl. No.: 15/890,043

(22) Filed: Feb. 6, 2018

(65) Prior Publication Data

US 2018/0223585 A1    Aug. 9, 2018

(30) Foreign Application Priority Data

Feb. 8, 2017  (DE) .................. 10 2017 201 942.5

(51) Int. Cl.
| | |
|---|---|
| *E05F 15/72* | (2015.01) |
| *E05F 15/60* | (2015.01) |
| *E05F 3/22* | (2006.01) |
| *H02K 7/102* | (2006.01) |
| *H02K 11/30* | (2016.01) |
| *H02K 51/00* | (2006.01) |
| *E05F 15/63* | (2015.01) |

(52) U.S. Cl.
CPC ............. *E05F 15/72* (2015.01); *E05F 3/222* (2013.01); *E05F 15/60* (2015.01); *E05F 15/63* (2015.01); *H02K 7/1023* (2013.01); *H02K 11/30* (2016.01); *H02K 51/00* (2013.01); *E05F 2015/631* (2015.01); *E05Y 2201/21* (2013.01); *E05Y 2201/218* (2013.01); *E05Y 2201/408* (2013.01); *E05Y 2201/434* (2013.01); *E05Y 2400/20* (2013.01); *E05Y 2400/302* (2013.01); *E05Y 2400/32* (2013.01); *E05Y 2400/52* (2013.01); *E05Y 2400/61* (2013.01); *E05Y 2400/616* (2013.01); *E05Y 2900/132* (2013.01)

(58) Field of Classification Search
CPC ..... E05F 15/72; E05F 15/60; E05Y 2400/302
See application file for complete search history.

(56) References Cited

U.S. PATENT DOCUMENTS

| | | | | |
|---|---|---|---|---|
| 4,973,894 A | * | 11/1990 | Johansson | ............. E05F 1/1016 318/266 |
| 5,428,278 A | * | 6/1995 | Bollengier | ............. E05F 15/73 318/446 |

(Continued)

FOREIGN PATENT DOCUMENTS

| | | |
|---|---|---|
| DE | 10259925 A1 | 9/2003 |
| DE | 102011055491 A1 | 5/2013 |

(Continued)

*Primary Examiner* — Gregory J Strimbu
(74) *Attorney, Agent, or Firm* — Steven M. Shape; Dennemeyer & Associates, LLC (57) ABSTRACT

A system for fixing and/or emergency opening of a leaf of a door, a window or other closure comprises a drive having at least one mechanical energy storage device, at least one electric motor having a motor shaft operatively connected to the leaf, and control electronics for controlling the electric motor. The electric motor can be actuated by the control electronics both for damping of the leaf movements and for fixing of the leaf against a force of the mechanical storage device and/or for electric motor-driven emergency opening of the leaf.

26 Claims, 4 Drawing Sheets

(56) References Cited

U.S. PATENT DOCUMENTS

| | | | | |
|---|---|---|---|---|
| 5,913,763 | A * | 6/1999 | Beran | E05F 3/102 |
| | | | | 49/506 |
| 6,049,287 | A * | 4/2000 | Yulkowski | A62C 2/24 |
| | | | | 292/251.5 |
| 8,405,337 | B2 * | 3/2013 | Gebhart | H02P 6/085 |
| | | | | 318/400.01 |
| 10,372,106 | B2 * | 8/2019 | Zasowski | G05B 19/042 |
| 2009/0260289 | A1 * | 10/2009 | Carpenter | E05F 5/00 |
| | | | | 49/26 |
| 2009/0265992 | A1 * | 10/2009 | Hass | E05F 15/63 |
| | | | | 49/340 |
| 2014/0346997 | A1 * | 11/2014 | Salutzki | E05F 3/224 |
| | | | | 318/628 |
| 2019/0316401 | A1 * | 10/2019 | Long | E05F 15/70 |
| 2019/0338578 | A1 * | 11/2019 | Soderqvist | H02P 3/08 |

FOREIGN PATENT DOCUMENTS

| | | |
|---|---|---|
| DE | 202013011874 U1 | 9/2014 |
| DE | 102015200284 B3 | 10/2015 |
| EP | 0947658 A2 | 10/1999 |
| EP | 1870552 A2 | 12/2007 |
| WO | 2016113031 A1 | 7/2016 |

\* cited by examiner

Fig. 4

FIXING AND/OR EMERGENCY OPENING SYSTEM FOR A DOOR LEAF

CROSS-REFERENCE TO RELATED APPLICATIONS

This application claims priority to German application 102017201942.5, filed Feb. 8, 2017, which is hereby incorporated by reference in its entirety.

BACKGROUND OF THE INVENTION

The invention relates to a system for the fixing and/or emergency opening of a leaf of a door, a window or the like, comprising a drive with at least one mechanical energy storage device, which is charged by an opening movement of the leaf and is discharged by a closing movement of the leaf, at least one electric motor, the motor shaft of which is operatively connected to the leaf, and open-loop and/or closed-loop control electronics, by means of which the electric motor can be actuated for generator-like damping of the leaf movements.

Drives or door closers for movable door leaves comprising a mechanical energy storage device and hydraulic damping are generally known. When a door leaf is opened manually, the mechanical energy storage device is charged with potential energy, which closes the released door leaf again. The mechanical energy storage device, for example, can comprise a spring, which is tensioned by the manual opening of the door leaf and is relaxed again as the door leaf is closed.

Door closers damped in a generator-like manner comprising at least one electric motor operated as a generator, the motor shaft of which is operatively connected to the leaf and the motor terminals of which can be short-circuited by means of open-loop or closed-loop control electronics in order to damp the leaf movements are also already known. Apart from a housing and a fitting for connection between a transmission and door leaf, such a door closer damped in a generator-like manner generally again also comprises a spring used as a mechanical storage device.

As the door is manually opened, the spring is tensioned, as a result of which potential energy is charged into the spring. At the same time, the transmission usually associated with the electric motor is rotated as the door is opened. The at least one electric motor is generally a brushed or brushless magnetically excited DC motor. On the one hand, electrical energy for the open-loop or closed-loop control electronics is thus generated from the leaf movement. On the other hand, the movement of the door leaf can be damped by means of the open-loop or closed-loop control electronics by short-circuiting of the motor windings. In particular, once the door leaf has been released, the closing movement of the door leaf caused by the relaxing spring can be damped in a controlled or regulated manner by means of the open-loop or closed-loop control electronics respectively, and, for example, this can be implemented by means of a pulse-width modulation of the short circuit according to the current position or the current speed of the door leaf.

Such a door leaf damped in a generator-like manner, similarly to a known hydraulically damped door closer, generally operates self-sufficiently, i.e. it does not require an external electrical energy source, either via the mains grid or via an accumulator.

A fixing device, according to the current guidelines, must cancel the self-closing property of the door closer by means of electrical energy according to the open-circuit principle.

In the event of an alarm, triggered, for example, by a fire detector, the trigger device of a fire detector control unit switches the electrical energy off, as a result of which the fixing device is released and the door leaf is closed by the spring constituting the mechanical storage device. If no electrical energy is applied to the fixing device, the door closes after being manually opened. Here, the door is closed in a controlled, i.e. damped, manner.

If a door closer is mounted on a supply air door, said door closer thus normally operates like a conventional door closer. In the case of an alarm, such as in the event of a fire or if there is smoke present, a smoke and heat extraction system supplies electrical energy, as a result of which the supply-air door is opened against the force of the spring of the door closer. Smoke is thus extracted in this manner from the building in question by means of the corresponding exhaust-air windows.

To this end, a supply-air opener is mounted beforehand, in addition to the hydraulic door closer, and generally comprises a motor transmission unit, which opens the door leaf by means of a lever or a roller. Supply-air openers and door closers in this case have to be decoupled to the extent that the door leaf can still be manually opened even if the supply-air opener is closed. In the event of a fire, the smoke and heat extraction control unit supplies electrical energy, as a result of which the supply-air opener opens the door leaf and keeps it open as long as the warning signal of the smoke and heat extraction control unit or the corresponding electrical energy is present.

The previously known door closers or drives damped in a generator-like manner cannot keep the door leaf open against the force of the mechanical storage device, i.e. they cannot fix the door leaf, nor can they open the door leaf against the force of the mechanical storage device, i.e. they cannot perform the supply air function for smoke and heat extraction.

SUMMARY OF THE INVENTION

The object of the invention is to describe a system for the fixing and/or emergency opening of a leaf of a door, a window or the like, in which the two functions of fixing and emergency opening are provided in the simplest and, accordingly, most economical manner possible.

This object is achieved in accordance with the invention by a fixing and/or emergency opening system having the features of claim 1. Preferred embodiments of the system according to the invention result from the dependent claims, the present description and the drawing.

The system according to the invention for the fixing and/or emergency opening of a leaf of a door, a window or the like comprises a drive or door closer with at least one mechanical energy storage device, which is charged by an opening movement of the leaf and is discharged by a closing movement of the leaf, at least one electric motor, the motor shaft of which is operatively connected to the leaf, and open-loop and/or closed-loop control electronics for actuating the electric motor. Here, the electric motor can be actuated by means of the open-loop and/or closed-loop control electronics both for generator-like damping of the leaf movements and for fixing the leaf against the force of the mechanical storage device and/or for electric motor-driven emergency opening of the leaf in that the electric motor additionally can be supplied with external electrical energy from an external device, in particular such as a smoke detector control unit, a smoke and heat extraction control unit or the like, for the fixing and/or emergency opening of the leaf.

On the basis of this design, the at least one electric motor, operated as a generator for damping the leaf movements, of a drive or door closer damped in a generator-like manner can also be used for the fixing and emergency opening of the leaf, so these two functions are provided easily and, accordingly, economically. The at least one electric motor can thus be supplied with electrical energy, for example, from a trigger device in order to hold the leaf open, and, for example, from a smoke and heat extraction control unit in order to open the door in the event of an alarm. Here, the electrical energy can be delivered from the mains grid or from an electrical energy storage device.

The electric motor advantageously can be actuated by means of the open-loop and/or closed-loop control electronics according to an external control signal produced by an output signal of the external device for the fixing and/or emergency opening of the leaf. Here, the electric motor can be supplied with the external electrical energy advantageously by means of the external control signal for the fixing and/or electric motor-driven emergency opening of the leaf. Thus, not only the respective fixing or emergency opening function is triggered by means of the relevant external control signal. In this case, this external control signal at the same time also delivers the additional electrical energy necessary for the electric motor.

The drive expediently comprises an electrical energy storage device, which can be charged by means of an electric motor, operable as a generator and operatively connected by means of its motor shaft to the leaf, and by means of which the open-loop and/or closed-loop control electronics can be supplied with energy. Here, the electric motor provided to charge the electrical energy storage device and operable as a generator can be an electric motor also provided for damping of the leaf movements and for fixing and/or emergency opening or can be a separate motor. In particular, embodiments in which the electrical energy storage device is charged by the at least one electric motor provided both for generator-like damping of the leaf movements and for fixing and/or emergency opening are thus also conceivable in principle.

The open-loop and/or closed-loop control electronics preferably comprises a damping circuit having at least one switch element which can be actuated by means of an open-loop and/or closed-loop control unit and by means of which the motor terminals of the electric motor connected to the damping circuit can be short-circuited for generator-like damping of the leaf movements.

The open-loop and/or closed-loop control electronics preferably comprises a switching unit, which can be switched over between a first switched state, in which the motor terminals of the electric motor are connected to the damping circuit for generator-like damping of the leaf movements, and a second switched state, in which a voltage provided by the external electrical energy is applied to the motor terminals of the electric motor for fixing the leaf in a fixed position, which in particular is predefinable, and/or for electric motor-driven emergency opening of the leaf. The fixed position can correspond, for example, to the maximum opening position of the leaf or also can be predefined in a variable manner. The switching unit for example can be integrated in the damping circuit and can interrupt this for the fixing or emergency opening of the leaf.

It is advantageous in particular if the switching unit assumes its second switched state for the fixing of the leaf if the leaf assumes the, in particular, predefinable fixed position and the external control signal is applied to the open-loop and/or closed-loop control electronics.

According to a preferred practical embodiment of the system according to the invention, the switching unit comprises a relay, by means of which the motor terminals of the electric motor, in the de-energised state, can be connected to the damping circuit for generator-like damping of the leaf movements, and by means of which a voltage provided by the external electrical energy can be applied to the terminals of the electric motor, in the energised state, for the fixing and/or electric motor-driven emergency opening of the leaf.

According to an expedient practical embodiment of the system according to the invention, the external control signal of the switching unit can be fed by means of a position switch, which can be closed when the leaf assumes the, in particular, predefinable fixed position. It is in particular also advantageous if a level adjustment unit is provided for generating the voltage to be applied to the electric motor for the fixing and/or electric motor-driven emergency opening of the leaf, by means of which level adjustment unit the level of the external control signal can be adjusted to the level necessary for the voltage supply of the electric motor.

An alternative embodiment of the system according to the invention that is advantageous in particular in view of energy optimisation is characterised in that the external control signal of the switching unit can be fed via an open-loop and/or closed-loop control unit of the open-loop and/or closed-loop control electronics according to the output signal of a position sensor detecting the, in particular, predefinable fixed position of the leaf. Here, it is in particular also advantageous if, in order to generate the voltage to be applied to the electric motor for the fixing and electric motor-driven emergency opening of the leaf, the external control signal can be fed to the electric motor for level adjustment by means of such an open-loop and/or closed-loop control unit of the open-loop and/or closed-loop control electronics.

According to a further preferred practical embodiment of the system according to the invention, the switching unit comprises an H bridge which can be provided with the external control signal and which is made of electronic switches, in particular such as transistors, in which the electric motor actuatable both for generator-like damping of the leaf movements and for fixing of the leaf and/or for electric motor-driven emergency opening of the leaf is arranged and the electronic switches of which can be actuated by means of an open-loop and/or closed-loop control unit of the open-loop and/or closed-loop control electronics such that the electric motor can be operated as a generator for generator-like damping of the leaf movements or so that a voltage provided by the external electrical energy can be applied to the motor terminals of said motor for the fixing and/or electric motor-driven emergency opening of the leaf.

Here, it is advantageous in particular if the electronic switches of the H bridge can be actuated by means of the open-loop and/or closed-loop control unit so that, with the leaf assuming its, in particular, predefinable fixed position and with an external control signal applied, a voltage provided by the external electrical energy is applied to the motor terminals of the electric motor for the fixing and/or electric motor-driven emergency opening of the leaf.

The electronic switches of the H bridge can be actuated by means of the open-loop and/or closed-loop control unit for the fixing of the leaf preferably according to the direction of moment of the mechanical energy storage device and/or for the emergency opening of the leaf according to the direction of rotation of the leaf.

It is in particular also advantageous if the switching unit can be actuated by means of the associated open-loop and/or closed-loop control unit of the open-loop and/or closed-loop control electronics for the fixing of the leaf such that the electrical energy fed to the electric motor is just sufficient to compensate for the potential energy of the mechanical energy storage device.

According to a further practical embodiment of the system according to the invention, a bistable fixing unit can be actuated by means of the open-loop and/or closed-loop control unit provided for actuation of the switching unit for the fixing of the leaf in the, in particular, predefinable fixed position and/or for keeping the leaf open following an emergency opening thereof. Here, it is advantageous in particular if the bistable fixing unit comprises a bistable brake unit for acting on the motor shaft of the electric motor.

The bistable fixing unit preferably can be unlocked by means of the open-loop and/or closed-loop control unit in the event of an alarm, for example in particular in the case of fire.

The fixed position can correspond to the maximum open position of the leaf or advantageously also, for example, can be adjustable in a variable manner as a parameter by means of a commissioning unit or the like.

According to a further advantageous embodiment, the leaf can be fixed at least above a predefinable opening angle when a particular opening angle is reached. The leaf is thus fixed after an opening movement as soon as it is stopped.

The fixing of the leaf in a respective fixed position can be released expediently by manually actuating the leaf. Here, the force required for the manual release of the fixing can be parameterised. It is in particular also advantageous if, in the case of a particular fixing angle which is smaller than the maximum opening angle of the leaf, the fixing angle also can be passed through so that the leaf in particular can be manually released from the fixed position and can be opened beyond the relevant fixed position.

According to a further expedient practical embodiment of the system according to the invention, the drive comprises a safety sensor system which can be supplied with external electrical energy in particular via the external device. Here, it is advantageous in particular if the safety sensor system comprises at least one sensor for monitoring the region in the closing direction in front of the leaf on the opposite side to the hinge and/or at least one sensor for monitoring the region in the opening direction in front of the leaf on the hinge side.

A release of a fixing and/or the activation of a fixing and/or the damping of an opening movement of the leaf is advantageously provided by means of the open-loop and/or closed-loop control electronics according to output signals of the safety sensor system.

According to a further preferred embodiment of the system according to the invention, in the case of a double-leaf door having a fixed leaf and a moving leaf, each leaf, in particular for an electrical closing sequence control, is assigned at least one actuatable electric motor for fixing the leaf in an, in particular, predefinable fixed position and/or for electric motor-driven emergency opening of the leaf. External electrical energy can be fed preferably at least to the moving leaf in particular by means of the external device.

BRIEF DESCRIPTION OF THE DRAWINGS

The invention is explained in more detail below on the basis of embodiments with reference to the drawing, in which the following are shown.

DETAILED DESCRIPTION OF THE INVENTION

Figure 1:
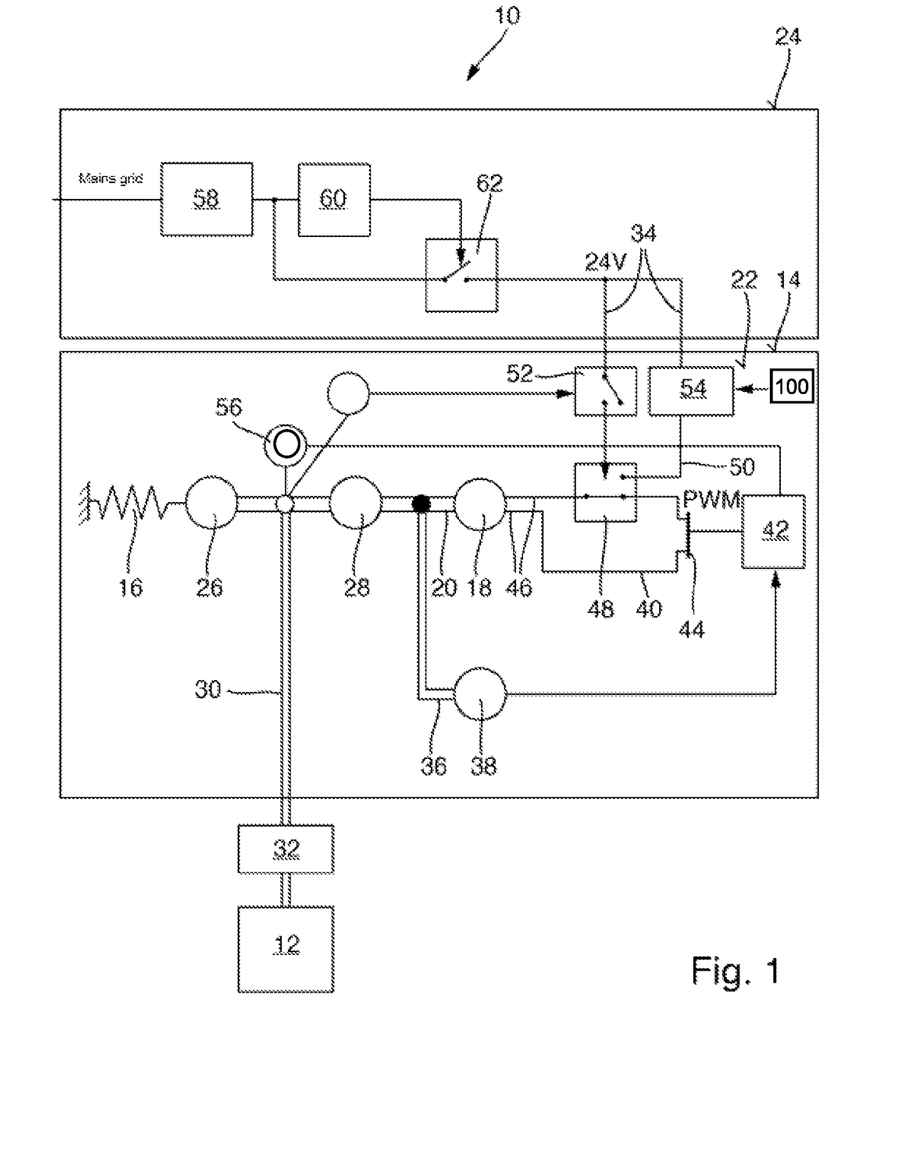
FIG. 1 a schematic representation of an exemplary embodiment of a system according to the invention for the fixing of a leaf of a door or the like, comprising a drive or door closer which is damped in a generator-like manner and which is provided with a switching unit comprising a relay, FIG. 2 a schematic representation of a further exemplary embodiment of a system according to the invention for the fixing of a leaf of a door or the like, comprising a drive or door closer which is damped in a generator-like manner and which comprises a relay, FIG. 3 a schematic partial representation of an exemplary embodiment of a system according to the invention for the fixing of a leaf of a door or the like, comprising a drive or door closer that is damped in a generator-like manner and which is provided with a switching unit comprising an H bridge formed of electronic switches, and FIG. 4 a schematic representation of an exemplary embodiment of a system according to the invention for the emergency opening of a leaf of a door or the like, comprising a drive or door closer which is damped in a generator-like manner and which comprises an H bridge formed of electronic switches.

FIG. 1 shows, in a schematic representation, a system 10 for the fixing of a leaf or a door, in the present case, for example, of a pivoting leaf. The leaf can also be a window leaf or the like.

The fixing system 10 comprises a drive 14, which is designed here, for example, in the form of a door closer. The drive 14 comprises a mechanical storage device 16, which in particular comprises a spring and is charged by an opening movement of the leaf 12 and discharged by a closing movement of the leaf 12, an electric motor 18, the motor shaft 20 of which is operatively connected to the leaf 12, and open-loop and/or closed-loop control electronics 22 for actuating the electric motor 18.

Here, the electric motor 18 can be actuated by means of the open-loop and/or closed-loop control electronics 22 both for generator-like damping of the leaf movements and for fixing of the leaf 12 against the force of the mechanical storage device 16 in that the electric motor 18 can be supplied additionally with external electrical energy from an external device 24, which in the present case, for example, is a smoke detector control unit, for fixing of the leaf.

The mechanical energy storage device 16 and the electric motor 18 can each be coupled via a transmission 26 and 28 respectively to an output shaft 30 of the drive 14, which is coupled in turn to the leaf 12 by means of a fitting.

The electric motor 18 can be actuated by means of the open-loop and/or closed-loop control electronics 22 according to an external control signal 34 formed by an output signal of the external device 24 for the fixing of the leaf 12. Here, the electric motor 18 can also be supplied with the external electrical energy, for example via said external control signal 34, for the fixing of the leaf 12.

The drive 14 can additionally comprise an electrical energy storage device, which can be charged by means of an electric motor 38 that is operable as a generator and operatively connected by means of its motor shaft 36 to the leaf 12, and which can be supplied with energy by means of the open-loop and/or closed-loop control electronics 22.

The open-loop and/or closed-loop control electronics 22 can comprise a damping circuit 40 having at least one switch element 44 which can be actuated by means of an open-loop and/or closed-loop control unit 42 and by means of which the motor terminals 46 of the electric motor 18 connected to the damping circuit 40 can be short-circuited for generator-like damping of the leaf movements.

The open-loop and/or closed-loop control electronics 22 can comprise a switching unit 48, which can be switched over between a first switched state, in which the motor terminals 46 of the electric motor 18 are connected to the damping circuit 40 for generator-like damping of the leaf movements, and a second switched state, in which a voltage 50 provided by the external electrical energy is applied to the motor terminals 46 of the electric motor 18 in order to fix the leaf 12 in a fixed position, which in particular is predefinable. In the present case, the switching unit 48 assumes its second switched state for the fixing of the leaf 12 if the leaf 12 assumes the, in particular, predefinable fixed position and the external control signal 34 is applied to the open-loop and/or closed-loop control electronics 22.

As can be seen from FIG. 1, the switching unit 48 can comprise a relay, for example, which in the present case is switched into the damping circuit 40. In the de-energised state, the damping circuit 40 is closed by means of this relay, or the motor terminals 46 of the electric motor 18 are connected to the damping circuit 40 for generator-like damping of the leaf movements, whereas in the energised state the voltage 50 provided by the external electrical energy is applied to the terminals 46 of the electric motor 18 by means of said relay for the fixing of the leaf 12.

In the present case, the external control signal 34 can be fed to the switching unit 48 by means of a position switch 52, which can be closed when the leaf 12 assumes the, in particular, predefinable fixed position. In addition, in the present case, a level adjustment unit 54 is provided in order to generate the voltage 50 to be applied to the electric motor 18 for the fixing of the leaf 12, by means of which level adjustment unit the level of the external control signal 34 can be adjusted to the level necessary for the voltage supply of the electric motor 18.

As can additionally be seen from FIG. 1, the open-loop and/or closed loop control unit 42 can be connected to a measuring circuit, such as a position sensor 56 or the like, by means of which the position, pivot direction, pivot speed and/or the like of the leaf 12 is detected.

The external device 24 provided in the present case, for example, as a smoke detector control unit can comprise, for example, a grid part 58 connected to the mains grid, at least one fire detector 60, and a trigger device 62. The external device 24 can be accommodated in its own housing or can be integrated in the drive or door closer 14.

In the de-energised state, the switching unit 48 comprising a relay in the present case closes the damping circuit 40, i.e. the motor terminals 46 of the electric motor 18 are connected to the damping circuit 40. The drive 14 thus operates as a drive damped in a generator-like manner or as a door closer damped in a generator-like manner. The output voltage of the external device 24 or of the smoke detector control unit is applied to the coil of the relay of the switching unit 48 by means of the position switch 52. The position switch 52 closes its contact as soon as the leaf 12 is fully opened, wherein in the present case the maximum open position of the leaf 12, for example, constitutes the fixed position. In principle, however, an embodiment in which the fixed position can be predefined in a variable manner is also conceivable.

If the external device 24 or smoke detector control unit, for example, in the event of an alarm does not supply any voltage or if the leaf 12 is not fully open, the relay of the switching unit 48 does not energise. After an opening, the leaf 12 closes in a generator-like and damped manner. To open, the spring of the mechanical storage device 16 must be tensioned.

If the leaf 12 is in the fixed position and if the external device 24 or smoke detector control unit delivers voltage, the relay of the switching unit 48 energises and connects the electric motor 18 to voltage. The leaf 12 in the present case is pressed against the open position. The opening moment of the electric motor 18 is set by means of the level adjustment unit 54.

The leaf 12 in this embodiment can also be manually released by being manually pressed shut against the opening moment of the electric motor 18. As soon as the position switch 52 interrupts the connection, the leaf closes in a generator-like and damped manner. To this end, the open-loop and/or closed-loop control unit 42 can perform, for example, a pulse-width modulation of the motor current of the electric motor 18 by means of the switching element 44, for example, comprising a field-effect transistor, so as to set an effective damping force for damping of the leaf movements. The damping of the leaf movements can be adjusted, for example, according to a current movement direction and/or a current speed and/or a current opening angle of the leaf 12. In addition, the leaf movements can be damped in particular as described in DE 10 2015 200 284 B3, the disclosure of which is incorporated in the present specification.

Figure 2:
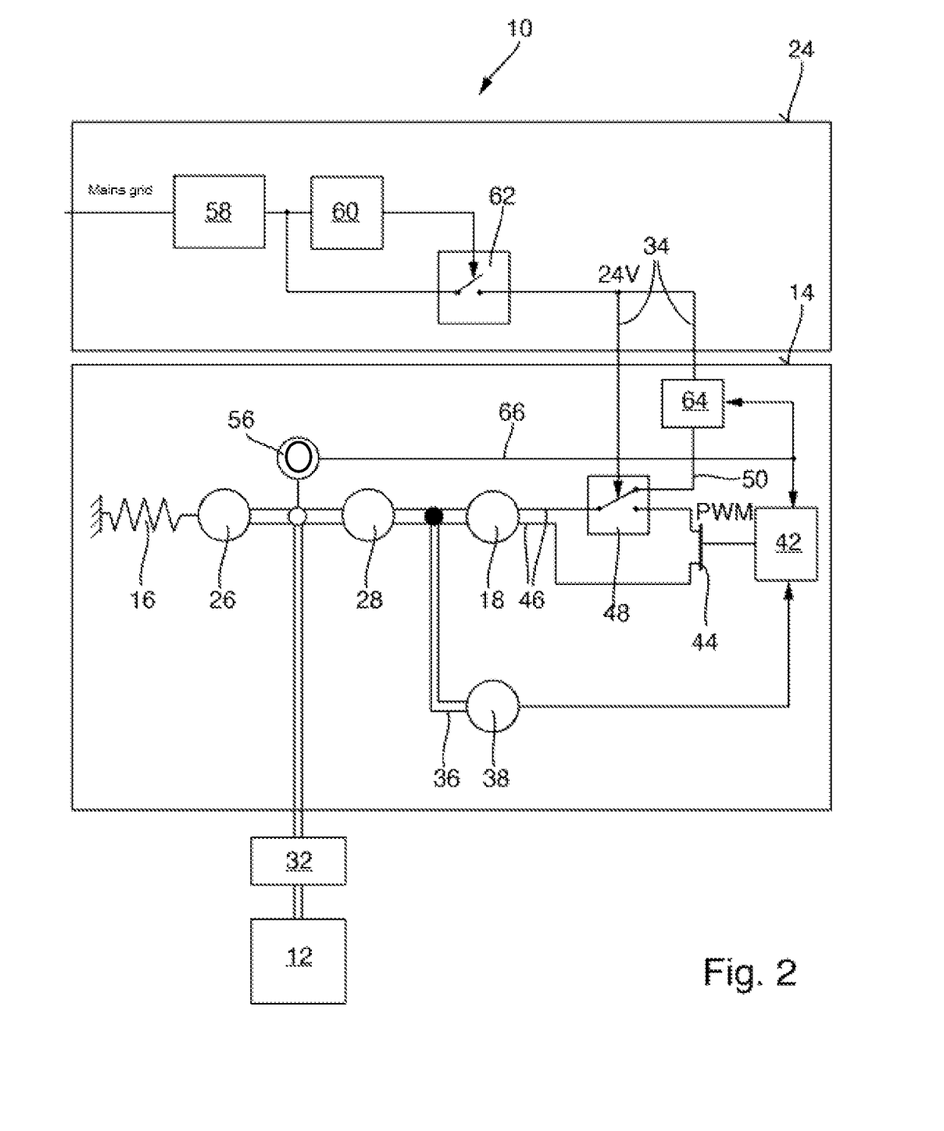

FIG. 2 shows, in a schematic representation, a further exemplary embodiment of a system 10 according to the invention for the fixing of a leaf 12 of a door or the like, comprising a drive 14 or door closer that is damped in a generator-like manner and that comprises a relay. In the present case, the external control signal 34 can be fed to the switching unit 48 comprising a relay by means of a further open-loop and/or closed-loop control unit 64 of the open-loop and/or closed-loop control electronics 22 according to the output signal 66 of the position sensor 56 detecting the fixed position of the leaf 12. Here, in the present case, a level adjustment is performed by means of this further open-loop and/or closed-loop control unit 64 in order to generate the voltage to be fed to the electric motor 18 by means of the relay of the switching unit 48 for the fixing of the leaf 12.

The present embodiment thus differs from FIG. 1 at least substantially in that the position switch and the level adjustment are replaced by the intelligent open-loop and/or closed-loop control unit 64. The functions correspond to one another at least substantially. The open-loop and/or closed-loop control unit 64 detects the signal of the position sensor 56 and energises the relay of the switching unit 48 only when the leaf 12 is in the fixed position and the trigger device 62 of the external device 24 or smoke detector control unit supplies energy, i.e. there is an alarm.

For example, it is now possible, by means of the open-loop and/or closed-loop control unit 64, to adjust the electrical energy fed to the electric motor 18 such that this is just sufficient to compensate for the potential energy of the spring of the mechanical energy storage device 16. This can be implemented, for example, by a position control on the basis of the signal of the position sensor 56, by learning the required holding energy during release and/or the like.

An energy-saving embodiment of the fixing can thus be achieved, which can also be manually released with minimal force.

The external device 24 or smoke detector control unit can also be arranged here again in its own housing or in the housing of the drive 14 or door closer.

In addition, this embodiment also has again at least substantially the same structure as FIG. 1, wherein corresponding parts have been assigned the same reference signs.

Figure 3:
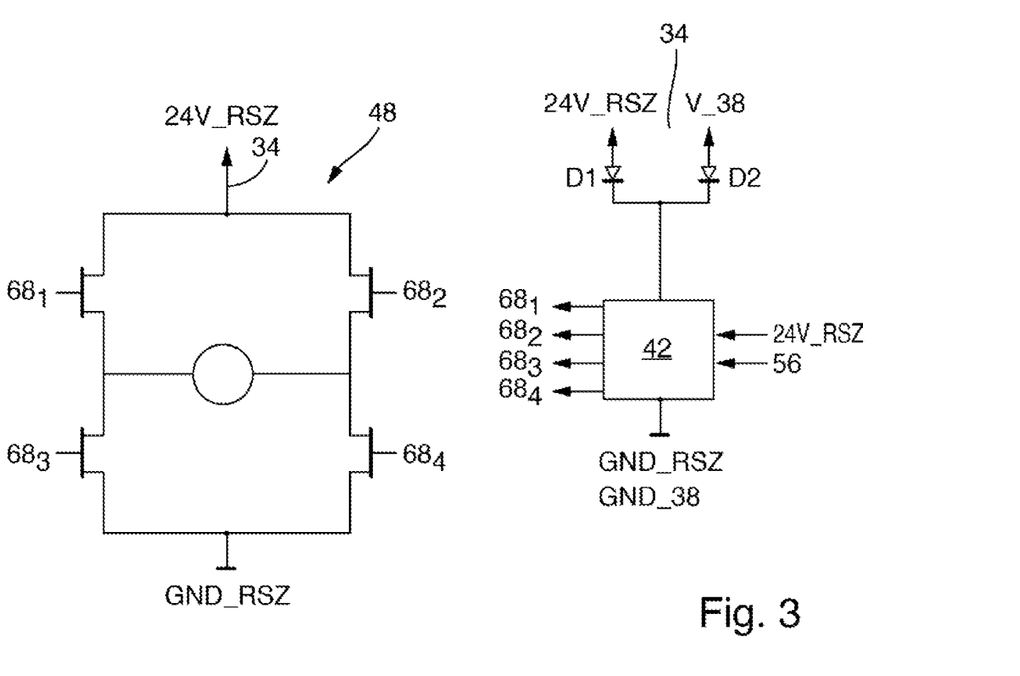

FIG. 3 shows, in a schematic partial representation, a further exemplary embodiment of a system 10 according to the invention for fixing a leaf 12 of a door or the like, wherein merely the region of the switching unit 48 is shown.

In the present case, the switching unit 48 comprises an H bridge, which can be provided with the external control signal 34 and which is formed of electronic switches 68, in particular such as transistors, and in which the electric motor 18, actuatable both for generator-like damping of the leaf movements and for fixing of the leaf 12, is arranged. Here, the electronic switches 68 of this H bridge of the switching unit 48 can be actuated by means of the open-loop and/or closed-loop control unit 42 of the open-loop and/or closed-loop control electronics 22 such that the electric motor 18 (cf. also FIG. 2 again) can be operated as a generator for generator-like damping of the leaf movements or, a voltage provided by the external electrical energy can be applied to the motor terminals 46 of said electric motor for the fixing of the leaf 12.

Here, the electronic switches 68 of the H bridge of the switching unit 48 can be actuated by means of the open-loop and/or closed-loop control unit 42 in particular such that, when the leaf 12 assumes its, in particular, predefinable fixed position and the external control signal 34 is applied for the fixing of the leaf 12, a voltage provided by the external electrical energy is applied to the motor terminals 46 of the electric motor 18 (cf. also FIG. 2 again). The electronic switches 68 of the H bridge can be actuatable by means of the open-loop and/or closed-loop control unit 42 for the fixing of the leaf 12 in particular according to the direction of moment of the mechanical energy storage device 16.

In the present case, the open-loop and/or closed-loop control unit 42 of the drive 14 or door closer damped in a generator-like manner thus also performs the fixing of the leaf (12) (cf. also FIG. 2 again). Here, in FIG. 3, only the portion, modified accordingly, of the embodiment according to FIG. 2 is shown. Each of the electronic switches $68_1$ to $68_4$ can be actuated separately by means of the open-loop and/or closed-loop control unit 42.

If the leaf 12 is not in the fixed position, which can be signalled by means of the position sensor 56, or if the external device 24 or smoke detector control unit (cf. also FIG. 2 again) does not provide the required voltage of, for example, 24 V (signal "24V-RSZ"), this is identified by the open-loop and/or closed-loop control unit 42 on the basis of these two signals. After manual opening, the leaf 12 closes, in a generator-like and damped manner. The open-loop and/or closed-loop control unit 42 to this end opens the electronic switches $68_1$ and $68_2$ and damps the closing movement of the leaf 12, for example by a pulse-width-modulated short circuit of the electric motor 18 by means of the electronic switches $68_3$ and $68_4$. The open-loop and/or closed-loop control unit 42 is supplied here either from the electric motor 38 operating as a generator (cf. also FIG. 2 again) or the voltage 24V-RSZ delivered by the external device 24 or smoke detector control unit.

If the external device 24 or smoke detector control unit delivers the required voltage of, for example, 24 V and the leaf 12 assumes its fixed position, this is identified by the open-loop and/or closed-loop control unit 42, which then holds or fixes the leaf 12 by actuating the two electronic switches $68_1$ and $68_4$ or $68_2$ and $68_3$ according to the direction of the spring moment against the force of the spring of the mechanical energy storage device 16. The energy consumption is optimised by means of a, for example, pulse-width-modulated actuation of the two transistors and an evaluation of the output signal of the position sensor 56 as in the embodiment according to FIG. 2. The open-loop and/or closed-loop control unit 42 can now be supplied from the external device 24 or the smoke detector control unit (24V-RSZ).

In addition, this embodiment according to FIG. 3 can again have at least substantially the same structure as that of FIG. 2.

Figure 4:
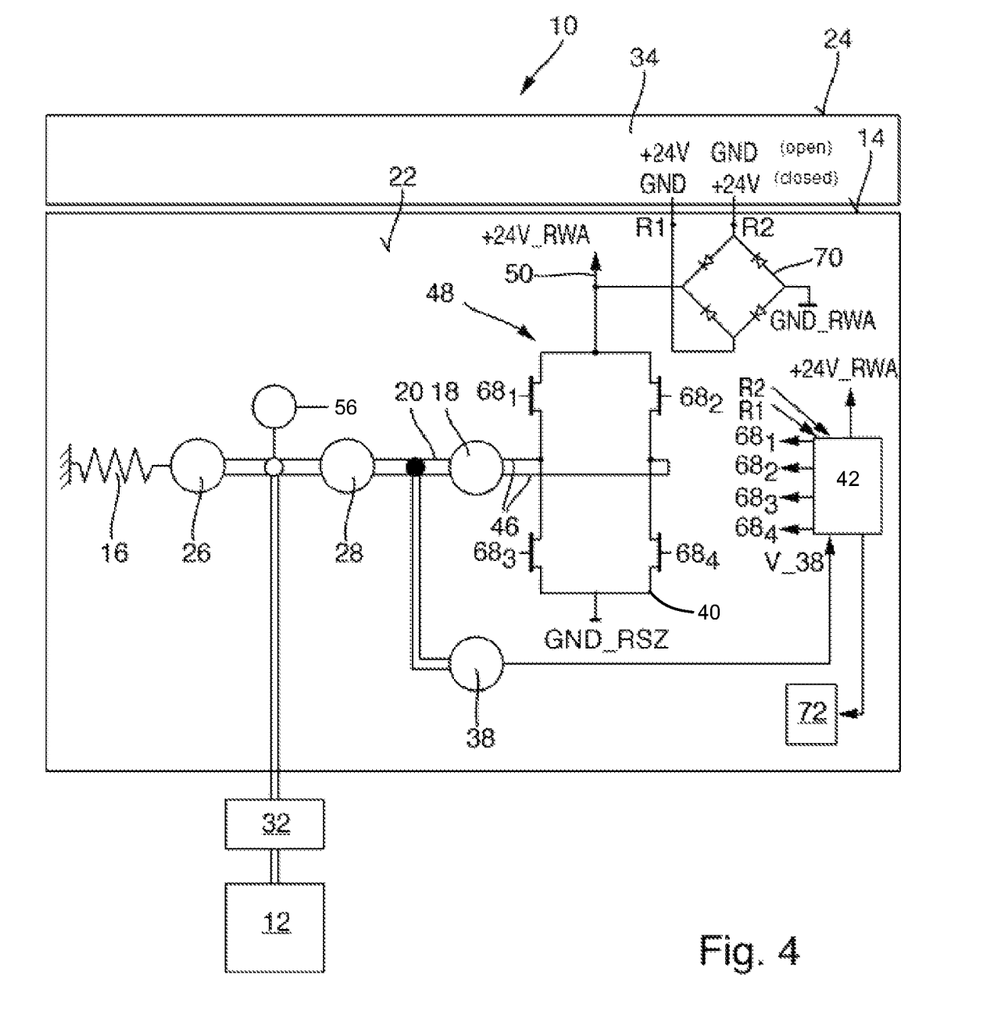

FIG. 4, in a schematic representation, shows an exemplary embodiment of a system 10 according to the invention for the emergency opening of a leaf 12 of a door or the like, in which the open-loop and/or closed-loop control electronics 22 of the drive 14 or door closer comprises a switching unit 48, which can be switched over between a first switched state, in which the motor terminals 46 of the electric motor 18 are connected to the damping circuit 40 for generator-like damping of the leaf movements, and a second switched state, in which a voltage 50 provided by the external electrical energy from an external device 24, which in this case is a smoke and heat extraction control unit, for example, is applied to the motor terminals 46 of the electric motor 18 for the electric motor-driven emergency opening of the leaf 12.

The switching unit 48 in the present case comprises an H bridge, which can be acted on by the external control signal 34 and which is formed of electronic switches 68, in particular such as transistors, and in which the electric motor 18, actuatable both for generator-like damping of the leaf movements and for electric motor-driven emergency opening of the leaf 12, is arranged. The electronic switches can be actuated in the present case by means of the open-loop and/or closed-loop control unit 42 of the open-loop and/or closed-loop control electronics 22 such that the electric motor 18 can be operated as a generator for generator-like damping of the leaf movements or a voltage provided by the external electrical energy can be applied to the motor terminals 46 of said electric motor for the electric motor-driven emergency opening of the leaf 12. Here, the electronic switch 68 of the H bridge, for the emergency opening of the leaf 12, can be actuated in particular according to the direction of rotation of the leaf 12.

As can be seen on the basis of FIG. 4, the external output signal 34, which is formed by the output signal of the external device 24 or smoke and heat extraction control unit (RWA), can be fed to the switching unit 48 comprising the H bridge by means of a rectifier or diode bridge 70.

Normally, i.e. when there is no alarm, there is no voltage applied to the motor line (R1=0, R2=0). The open-loop and/or closed-loop control unit 42 in this case actuates the H bridge of the switching unit 48 to damp the drive 14 or door closer in a generator-like manner. The open-loop and/or closed-loop control unit 42 blocks the electronic switches $68_1$ and $68_2$ of the H bridge containing the electric motor 18 and thus damps the closing of the leaf 12, for example, by a pulse-width-modulated short circuit of the electronic switches $68_1$ and $68_4$.

In the case of an alarm, the external device 24 or smoke and heat extraction control unit applies an external control signal 34, here for example 24 V, to the motor line (R1=24V, R2=GND) so as to open the leaf 12. The open-loop and/or closed-loop control unit 42 is now supplied from the motor line (24V-RWA). The open-loop and/or closed-loop control unit 42 infers the command "open" from the signals R1 and R2 and opens the leaf 12 with generator-like damping, in that the electric motor 18 is controlled accordingly by a corresponding actuation of the electronic switches $68_1$ and $68_4$ or $68_2$, for example, in a pulse-width-modulated manner, and according to the output signal of the position sensor 56, according to the direction of rotation of the leaf 12. If the leaf 12 is open, the open-loop and/or closed-loop control unit 42 energises a bistable fixing unit 72, which, for example, can comprise a bistable brake unit for acting on the motor shaft 20 of the electric motor 18. The leaf 12 now remains in the open position against the force of the mechanical energy storage device 16, which in the present case comprises a spring, for example, without the external device 24 or the smoke and heat extraction control unit (RWA) having to provide energy.

Following an alarm reset, the external device 24 or smoke and heat extraction control unit (RWA) attempts to close the leaf 12. To this end, the motor line reverses the polarity of the voltage (R1=GND, R2=24V). This is identified by the open-loop and/or closed-loop control unit 42 from the signals R1 and R2. The open-loop and/or closed-loop control unit 42 is now also supplied with electrical energy from the external device 24 or smoke and heat extraction control unit (RWA), which occurs by means of the diode or rectifier bridge 70. The open-loop and/or closed-loop control unit 42 unlocks the bistable fixing unit 72 by means of a short pulse, whereupon the leaf 12 closes, in a generator-like and damped manner, similarly to after manual opening, for example, in that the electronic switches $68_1$ and $68_2$ are blocked and a, in particular, pulse-width-modulated short circuit of the motor terminals 46 of the electric motor 18 is generated by means of the electronic switches $68_3$ and $68_4$.

Moreover, this embodiment according to FIG. 4 can again, at least substantially, have the same construction as that of FIG. 2. Parts that correspond to one another are assigned like reference signs.

Any combinations of the above-described exemplary embodiments are also conceivable.

The aforementioned fixed position can be predefined, for example, by the maximum open position of the leaf 12 or can be adjustable in a variable manner as a parameter by means of a commissioning unit or the like.

For example, embodiments in which the leaf 12 can be fixed at least above a predefinable opening angle when an opening angle is reached are also conceivable.

The fixing of the leaf 12 in a fixed position can be released by manual actuation of the leaf 12. Here, the force required to manually release the fixing, for example, can be parameterised.

In particular, embodiments are also conceivable in which, with a particular fixing angle which is smaller than the maximum opening angle of the leaf 12, the fixing angle also can be passed through so that the leaf 12 in particular can be manually released from the fixed position and can be opened beyond the relevant fixed position.

The drive 14 can also comprise a safety sensor system 100 that can be supplied with external electrical energy in particular by means of the external device 24. A safety sensor system of this kind can comprise in particular at least one sensor for monitoring the region in the closing direction in front of the leaf 12 on the opposite side to the hinge and/or at least one sensor for monitoring the region in the opening direction in front of the leaf 12 on the hinge side.

Here, in particular, embodiments are also conceivable in which a release of a fixing and/or the activation of a fixing and/or the damping of an opening movement of the leaf 12 is provided via the open-loop and/or closed-loop control electronics 22 according to output signals of the safety sensor system.

In the case of a double-leaf door having a fixed leaf and a moving leaf, each leaf 12, in particular for electrical closing sequence control, is assigned at least one actuatable electric motor 18 for fixing the leaf 12 in an, in particular, predefinable fixed position and/or for electric motor-driven emergency opening of the leaf 12. In this case, external electrical energy can be fed at least to the moving leaf in particular by means of the external device 24.

REFERENCE SIGN LIST 10 system
12 leaf
14 drive
16 mechanical energy storage device
18 electric motor
20 motor shaft
22 open-loop and/or closed-loop control electronics
24 external device
26 transmission
28 transmission
30 output shaft
32 fitting
34 external control signal
36 motor shaft
38 electric motor
40 damping circuit
42 open-loop and/or closed-loop control unit
44 switching element
46 motor terminals
48 switching unit
50 voltage
52 position switch
54 level adjustment unit
56 position sensor
58 grid part
60 fire detector
62 trigger device
64 open-loop and/or closed-loop control unit
66 output signal
68 electronic switch
70 rectifier bridge
72 bistable fixing unit

The invention claimed is:

1. A system (10) for fixing a leaf (12) of a door in a fixed position and for opening the leaf (12), the system comprising:
   a drive (14) including:
      a mechanical energy storage device (16) charged by an opening movement of the leaf (12) and discharged by a closing movement of the leaf (12);
      an electric motor (18) including a motor shaft (20) operatively connected to the leaf (12); and
      control electronics (22) configured to actuate the electric motor (18), wherein the electric motor (18) is actuated by the control electronics (22) and supplied with electrical energy from a device (24) for fixing the leaf (12) against a force of the mechanical storage device (16) in the fixed position and for electric motor-driven opening of the leaf and the electric motor is actuated by the control electronics for damping the opening movement of the leaf or the closing movement of the leaf.

2. The system according to claim 1 wherein the electric motor (18) is actuated by the control electronics (22) according to a control signal (34) from the device (24).

3. The system according to claim 1 wherein the electric motor (18) is a brushless DC motor, such that the leaf (12) is fixed in the fixed position by applying an electrical voltage to at least one motor winding of the electric motor.

4. The system according to claim 1 wherein the drive (14) comprises an electrical energy storage device charged by an additional electric motor (38), the additional electric motor operable as a generator and operatively connected by a motor shaft (36) to the leaf (12).

5. The system according to claim 1 wherein the control electronics (22) comprises a damping circuit (40) having at least one switch element (44) actuated by a control unit (42), and motor terminals (46) of the electric motor (18) are connected to the damping circuit (40) and are short-circuited for damping the leaf movements.

6. The system according to claim 5 wherein the control electronics (22) comprises a switching unit (48) switched between a first switched state, in which the motor terminals (46) of the electric motor (18) are connected to the damping circuit (40) for damping the leaf movements, and a second switched state, in which a voltage (50) is applied to the motor terminals (46) of the electric motor (18) to fix the leaf (12) in the fixed position.

7. The system according to claim 6 wherein the switching unit (48) comprises an H bridge formed of electronic switches (68), the electronic switches (68) actuatable by the control unit (42) of the control electronics (22) to operate the electric motor as a generator for damping the leaf movements.

8. The system according to claim 7 wherein the electronic switches (68) of the H bridge are configured to be actuated by the control unit (42) to fix the leaf (12) in the fixed position according to a direction of moment of the mechanical energy storage device (16).

9. The system according to claim 7 wherein the control unit is configured to actuate the electronic switches (68) of the H bridge to apply the voltage to the motor terminals of the electric motor to fix the leaf in the fixed position when with the leaf (12) is in the fixed position and a control signal (34) is received by the control electronics.

10. The system according to claim 7 wherein the electronic switches (68) of the H bridge are configured to be actuated by the control unit (42) to open the leaf (12).

11. The system according to claim 6 wherein the electric motor (18) is actuated by the control electronics (22) for fixing the leaf in the fixed position when the leaf (12) is in the fixed position and when a control signal (34) from the device (24) is received by the control electronics causing the switching unit (48) to be placed in the second switched state.

12. The system according to claim 6 wherein a control signal (34) is fed to the switching unit (48) by a position switch (52), which is closed when the leaf (12) is in the fixed position.

13. The system according to claim 6 wherein the switching unit (48) comprises a relay having an energized state and an de-energized state, when the relay is in the de-energized state, the motor terminals (46) of the electric motor (18) are connected to the damping circuit (40) for damping the leaf movements, and when the relay is in the energized state, the voltage (50) is applied to the motor terminals (46) of the electric motor (18) for fixing the leaf in the fixed position or opening the leaf (12).

14. The system according to claim 6 wherein a control signal (34) is fed to the switching unit (48) by a second control unit (64) of the control electronics (22) according to an output signal (66) of a position sensor (56) detecting that the leaf (12) is in the fixed position.

15. The system according to claim 6 wherein the switching unit (48) is actuatable by the control unit (42) of the control electronics (22) to fix the leaf (12) in the fixed position by supplying sufficient electrical energy to the electric motor (18) to overcome the force of the mechanical energy storage device (16).

16. The system according to claim 6 wherein the electric motor (18) is actuated by the control electronics (22) according to a control signal 04) from the device (24), and wherein control of the electric motor (18) is adjusted by a second control unit (64) of the control electronics (22).

17. The system according to claim 1 wherein the leaf (12) is releasable from the fixed position by manual actuation of the leaf (12).

18. The system according to claim 17 wherein a force required for the manual actuation of the leaf is adjustable.

19. The system according to claim 1 wherein the door further comprises an additional leaf associated with at least one additional electric motor (18) for fixing the additional leaf in an additional fixed position or for opening the additional leaf.

20. The system according to claim 19 wherein the device supplies the electrical energy to at least one of the electric motor or the additional electric motor.

21. The system according to claim 1 wherein the fixed position of the leaf is less than a fully open position of the leaf (12) such that the leaf (12) is adapted to be manually released from the fixed position by opening the leaf beyond the fixed position.

22. The system according to claim 1 wherein the fixed position of the leaf is adjustable.

23. The system according to claim 1 wherein the drive (14) comprises a safety sensor system supplied with electrical energy from the device (24).

24. The system according to claim 23 wherein the control electronics (22) controls the electric motor according to output signals of the safety sensor system.

25. The system according to claim 24 wherein the safety sensor system comprises at least one sensor configured to monitor at least one of a region on a first side of the leaf (12) adjacent a latch side of the leaf or a region on a second side of the leaf (12) adjacent a hinge side of the leaf (12).

26. The system according to claim 1 wherein the electric motor (18) is actuated by the control electronics (22) according to a control signal (34) from the device (24), and wherein the control signal (34) is fed to and adjusted by a level adjustment unit (54) for controlling a voltage (50) applied to the electric motor.

* * * * *